(12) United States Patent
Norimoto

(10) Patent No.: US 10,029,579 B2
(45) Date of Patent: Jul. 24, 2018

(54) POWER SUPPLY SYSTEM

(71) Applicant: Michito Norimoto, Miyoshi (JP)

(72) Inventor: Michito Norimoto, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 936 days.

(21) Appl. No.: 14/382,830

(22) PCT Filed: Mar. 4, 2013

(86) PCT No.: PCT/IB2013/000474
§ 371 (c)(1),
(2) Date: Sep. 4, 2014

(87) PCT Pub. No.: WO2013/132315
PCT Pub. Date: Sep. 12, 2013

(65) Prior Publication Data
US 2015/0042154 A1 Feb. 12, 2015

(30) Foreign Application Priority Data
Mar. 5, 2012 (JP) .................. 2012-048181

(51) Int. Cl.
*B60L 1/00* (2006.01)
*B60L 3/00* (2006.01)
(Continued)

(52) U.S. Cl.
CPC ....... *B60L 11/1851* (2013.01); *B60L 11/1842* (2013.01); *B60L 11/1881* (2013.01); *B60R 16/033* (2013.01); *Y02E 60/721* (2013.01); *Y02T 10/7072* (2013.01); *Y02T 90/121* (2013.01); *Y02T 90/128* (2013.01); *Y02T 90/14* (2013.01);
(Continued)

(58) Field of Classification Search
CPC ... H01M 8/04; H01M 8/00; G06F 7/00; H02J 7/00; H02P 27/04; H02P 23/00; B60L 3/00; B60L 1/00; B60L 11/00
USPC ..... 307/9.1, 91, 10.1, 10.2, 10.7, 66, 64, 43; 429/25, 23, 30; 701/22, 24, 23, 21; 320/134, 119; 318/800, 504
See application file for complete search history.

(56) References Cited

U.S. PATENT DOCUMENTS

2002/0031690 A1\* 3/2002 Shimazu ............. B01B 1/005
429/425
2005/0052080 A1\* 3/2005 Maslov .............. B60L 8/00
307/10.1
(Continued)

FOREIGN PATENT DOCUMENTS

JP 2004-187385 A 7/2004

*Primary Examiner* — Rexford Barnie
*Assistant Examiner* — Jagdeep Dhillon
(74) *Attorney, Agent, or Firm* — Hunton Andrews Kurth LLP

(57) ABSTRACT

A power supply system includes a fuel cell system having a fuel cell that is mounted on a vehicle, and a controller for controlling the fuel cell system. The controller performs control to operate the fuel cell by switching as appropriate between a driving mode in which the vehicle travels, and an external power supply mode for supplying electric power to an external load. In the driving mode, a first voltage is set as a high-potential avoiding voltage, and in the external power supply mode, a second voltage that is higher than the first voltage is set as the high-potential avoiding voltage.

4 Claims, 3 Drawing Sheets

(51) Int. Cl.
  *H02G 3/00*   (2006.01)
  *B60L 11/18*  (2006.01)
  *B60R 16/033* (2006.01)

(52) U.S. Cl.
  CPC .............. *Y02T 90/163* (2013.01); *Y02T 90/34* (2013.01); *Y04S 10/126* (2013.01)

(56) References Cited

U.S. PATENT DOCUMENTS

| | | | |
|---|---|---|---|
| 2007/0274113 A1* | 11/2007 | Wang | H02M 1/10 363/109 |
| 2009/0134828 A1* | 5/2009 | Chakrabarti | H02P 27/08 318/440 |
| 2010/0055521 A1* | 3/2010 | Umayahara | H01M 8/04619 429/429 |
| 2010/0121511 A1* | 5/2010 | Onnerud | B60L 11/1851 701/22 |
| 2010/0131138 A1* | 5/2010 | Song | B60L 11/1887 701/22 |
| 2010/0190074 A1 | 7/2010 | Shimura et al. | |
| 2011/0033762 A1 | 2/2011 | Yoshida | |
| 2011/0291475 A1* | 12/2011 | Schaffnit | B60L 3/0046 307/10.1 |
| 2012/0115072 A1* | 5/2012 | Jeong | H01M 8/0232 429/534 |
| 2013/0047616 A1* | 2/2013 | Holmes | F24D 11/005 60/670 |

* cited by examiner

POWER SUPPLY SYSTEM

CROSS-REFERENCE TO RELATED APPLICATIONS

This is a national phase application based on the PCT International Patent Application No. PCT/IB2013/000474 filed Mar. 4, 2013, claiming priority to Japanese Patent Application No. 2012-048181 filed Mar. 5, 2012, the entire contents of both of which are incorporated herein by reference.

BACKGROUND OF THE INVENTION

1. Field of the Invention

This invention relates to a power supply system including a fuel cell.

2. Description of Related Art

A fuel cell in general has a membrane electrode assembly (MEA) including a pair of electrodes (formed of an anode and a cathode) holding the opposite sides of an electrolyte membrane, and a pair of fuel cell separators holding the opposite sides of the MEA. The anode has an anode catalyst layer and a diffusion layer. The cathode has a cathode catalyst layer and a diffusion layer. When the fuel cell is generating power, hydrogen gas serving as anode gas is supplied to the anode and oxygen gas serving as cathode gas is supplied to the cathode, whereby reaction that produces hydrogen ions and electrons takes place at the anode. The hydrogen ions reach the cathode through the electrolyte membrane, while the electrons reach the cathode through an external circuit. On the other hand, reaction among hydrogen ions, electrons and oxygen gas takes place to produce water at the cathode, whereby energy is emitted.

Recently, researches, developments and approaches have been widely conducted to utilize a fuel cell powered vehicle or the like having a fuel cell mounted as a driving energy source, as a source of electricity (external power source) for external loads. Japanese Patent Application Publication No. 2004-187385 (JP 2004-187385 A) for example proposes a distributed power supply system including a fuel cell powered vehicle having a fuel cell as a driving power supply, and an external power network which receives electric power generated by the fuel cell and outputs the electric power to external loads. This distributed power supply system is configured such that an on-vehicle fuel cell is operated to generate electric power and this generated power is supplied externally when the fuel cell powered vehicle is parked.

The distributed power supply system described in JP 2004-187385 A is configured on the assumption that the fuel cell is operated to generate power under maximum efficiency conditions during nighttime when the fuel cell powered vehicle is parked for a long period of time, and the generated power is output to a commercial power system that is an external power network. However, the range of applications of such a fuel cell mounted on a fuel cell powered vehicle used as an external power source is not limited to a commercial power system. The on-vehicle fuel cell is rather required to function as an external power source to directly supply power to electric appliances in a household, emergency shelter, and restoration site when the power supply from a commercial power system (commercial power source) is lost at a time of disaster or the like, for example.

Electric power required to operate electric appliances is usually several kW at most, whereas a fuel cell for driving a vehicle is able to generate electric power as high as from slightly less than 10 kW to about 100 kW or more (stack output) when it is operated normally. This means that a large amount of excessive power is generated when such power generation capable of generating power as high as about 100 kW is performed in order to supply power to an external load of about several kW since no power is required to drive accessories required to operate the vehicle.

SUMMARY OF THE INVENTION

The invention provides a power supply system capable of suppressing generation of excessive power when a fuel cell mounted on a vehicle is used as an external power source.

A first aspect of the invention relates to a power supply system including a fuel cell mounted on a vehicle, and a controller that operates the fuel cell in a driving mode when the vehicle travels and operates the fuel cell in an external power supply mode when electric power is supplied from the fuel cell to an external load, In the driving mode, the controller sets a high-potential avoiding voltage to a first voltage during power generation by the fuel cell, and in the external power supply mode, the controller sets the high-potential avoiding voltage cell to a second voltage higher than the first voltage during power generation by the fuel cell.

In the power supply system thus configured, the fuel cell, is operated by the control performed by the controller, in the "driving mode" when the vehicle is driven normally and in the "external power supply mode" when electric power is supplied to an external load. This means that the controller controls the operation of the fuel cell by selectively switching between the different modes of the driving mode and the external power supply mode.

The second voltage may be set to a voltage higher than a range of oxidation and reduction potentials for a catalyst metal in a catalyst layer of the fuel cell. In the driving mode, an upper limit voltage for avoiding a high potential during power generation by the fuel cell (high-potential avoiding voltage) to a first voltage in order to minimize elution of a catalyst metal used in a catalyst layer of the fuel cell. This makes it possible to suppress excessive loss of the catalyst metal in the driving mode. The first voltage set as the high-potential avoiding voltage in the driving mode may be a voltage at which degradation, of the cathode catalyst layer such as elution of the catalyst metal or reduced reactive area of the catalyst metal due to sintering is relatively difficult to occur.

In the external power supply mode, the high-potential avoiding voltage during generation of the fuel cell is set to a second voltage that is higher than the first voltage. In a fuel cell for driving a vehicle in general, the output voltage tends to become higher (the output current tends to become lower) when the output is reduced, due to its IV characteristics (current-voltage characteristics). Therefore, when the high-potential avoiding voltage is set to an appropriate second voltage higher than the first voltage of the fuel cell, it is thereby made possible to output lower output in the external power supply mode than the generated power output in the driving mode.

Therefore, when the fuel cell mounted on the vehicle is used as the external power source to supply electric power to an external load of about several kW, generation of a large amount excessive electric power, which occurs in the related art, can be effectively suppressed.

A second aspect of the invention relates to a power supply system including a fuel cell mounted on a vehicle, and a controller that controls a power generation parameter of the fuel cell so that a unit cell voltage of the fuel cell does not exceed a high-potential avoiding voltage when electric power is supplied from the fuel cell to an external load, and controls the power generation parameter so that the unit cell voltage when the vehicle travels is lower than the unit cell voltage when the electric power is supplied from the fuel cell to the external load.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Exemplary embodiments described below are for illustrative purposes only, and the invention is not intended to be limited to these embodiments. The invention can be modified or changed in various manners without departing from the scope of the invention.

Figure 1:
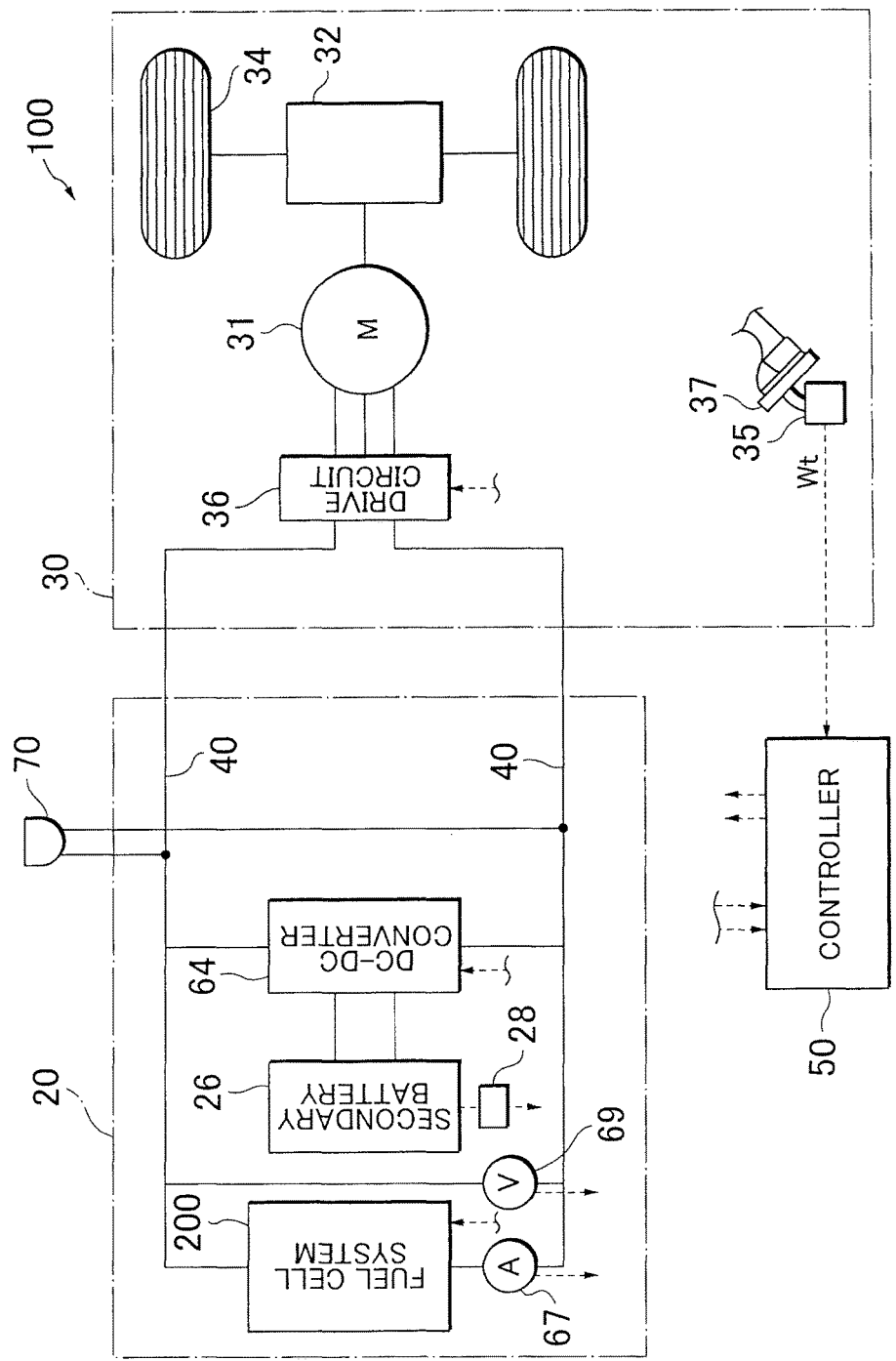
FIG. 1 is a schematic configuration diagram (system configuration diagram) of a vehicle equipped with a power supply system according to an embodiment of the invention.

FIG. 1 is a schematic configuration diagram (system configuration diagram) showing a vehicle equipped with a power supply system according to an embodiment of the invention. The vehicle 100 has a power supply system 20 and an internal load unit 30. The power supply system 20 supplies electric power as power source for the vehicle 100, and the internal load unit 30 converts the electric power supplied from the power supply system 20 into mechanical power for driving the vehicle 100.

The power supply system 20 has a fuel cell system 200, a secondary battery 26, a direct current-direct current (DC-DC) converter 64, a voltmeter 69 for measuring an output voltage of the fuel cell system 200, an ammeter 67 for measuring an output current thereof, and a remaining capacity monitor 28 for measuring a remaining amount of the secondary battery 26. The power supply system 20 further has a controller 50 for controlling the fuel cell system 200, the secondary battery 26 and the like.

The fuel cell system 200 is provided with a fuel cell (FC) (not shown) having a solid polymer electrolyte cell stack formed by stacking a plurality of unit cells in series, and a FC converter (not shown). This fuel cell has a plurality of unit cells each of which is configured such that an MEA having a polymer electrolyte membrane or the like sandwiched between a pair of electrodes (an anode and a cathode) is sandwiched by a pair of separators for supplying a fuel gas and an oxidation gas. An anode in general is formed by providing an anode catalyst layer on a porous support layer, and causes oxidation reaction of hydrogen. On the other hand, a cathode in general is formed by providing a cathode catalyst layer on a porous support layer, and causes reduction reaction of oxygen. As a result, an electromotive reaction (cell reaction) is caused to occur in a fuel cell as a whole.

The fuel cell is provided with a system for supplying a fuel gas to the anode, a system for supplying an oxidation gas to the cathode, and a system for providing a coolant (all not shown). The supply amounts of the fuel gas and oxidation gas are controlled according to a control signal from the controller 50, so that a desired amount of electric power is output from the fuel cell system 200.

The FC converter provided in the fuel cell system 200 assumes a role to control output voltage of the fuel cell. The FC converter converts (raises or reduces) an output voltage of the fuel cell input to its primary side (input side) into a voltage different from that of the primary side and outputs the converted voltage to its secondary side (output side). And conversely, the FC converter converts a voltage input to the secondary side into a voltage different from that of the secondary side and outputs the converted voltage to the primary side. The FC converter is thus a two-way voltage converter. This FC converter is controlled by the controller 50 as required, whereby the output voltage of the fuel cell system 200 is adjusted to a desired voltage.

The configuration and type of the FC converter are not limited particularly, and it may be one in which a three-phase operation system is employed. More specifically, the FC converter may preferably be a three-phase bridge converter, the three phases formed of U-phase, V-phase, and W-phase. The circuit configuration of the three-phase bridge converter is formed by combination of an inverter-like circuit portion for temporality converting an input DC voltage into an alternating current (AC) voltage and a portion for rectifying the AC voltage to convert the same into a different DC voltage.

The secondary battery 26 is connected to an internal load unit 30 in parallel with the fuel cell system 200. The secondary battery 26 functions as a storage source for storing excessive electric power, a storage source for storing regenerative energy during regenerative braking, and an energy buffer source during variation of load caused by acceleration or deceleration of the fuel cell powered vehicle. This secondary battery 26 may preferably be a secondary battery such as a nickel-cadmium battery, a nickel-hydrogen battery, and a lithium secondary battery.

Further, one or the other pole of a single-phase power receptacle 70, for example, is connected to a line 40 connecting the drive circuit 36 to the fuel cell system 200 and secondary battery 26 This single-phase power receptacle 70 is configured to receive connection of external loads (not shown) such as household electrical appliances, emergency illumination, and emergency power circuit equipment. Although the single-phase power receptacle 70 is illustrated in FIG. 1 as a female receptacle, the shape of the input/output portion is not limited to this.

The internal load unit 30 has an accelerator 37, and an acceleration sensor 35 for measuring a depression amount of the accelerator 37. The internal load unit 30 further has a traction motor 31, wheels 34 connected to the traction motor 31 via a gear mechanism 32, and a drive circuit 36 electrically connected to the traction motor 31. The traction motor 31 is connected to the power supply system 20 via the drive circuit 36. Power generated by the traction motor 31 is transmitted to the wheels 34 via the gear mechanism 32.

The drive circuit 36 is a circuit for driving the traction motor 31 with electric power supplied from the power supply system 20. The circuit configuration of the drive circuit 36 is not limited particularly and may be formed, for example, by a power control unit (PCU), a power element (switching element), or an inverter, having a boosting and voltage conversion functions. Specifically, the drive circuit 36 converts DC power supplied, for example, from the power supply system 20 into three-phase AC power and supplies the three-phase AC power to the traction motor 31. The magnitude of the three-phase AC power thus supplied is determined by the drive circuit 36 controlled by the controller 50 based on an input (accelerator depression amount) from the acceleration sensor 35. In this manner, the vehicle system is configured such that the output voltage of the power supply system 20 does not depend directly on the magnitude of the three-phase AC power supplied from the power supply system 20 to the traction motor 31.

The controller 50 is electrically connected not only to the fuel cell system 200, the DC-DC converter 64, and the drive circuit 36, but also to a speed sensor, a navigation system and the like (not shown) provided in the vehicle 100. The controller 50 performs various controls (including circuit control) and various input/output controls on these components. These various control operations by the controller 50 are realized by an engine control unit (ECU) or the like in the controller 50 executing a computer program stored in a memory (not shown) incorporated in the controller 50. The memory used for this purpose is not limit particularly, and may be selected from various recording media such as read only memories (ROMs) and hard discs.

Figure 2:
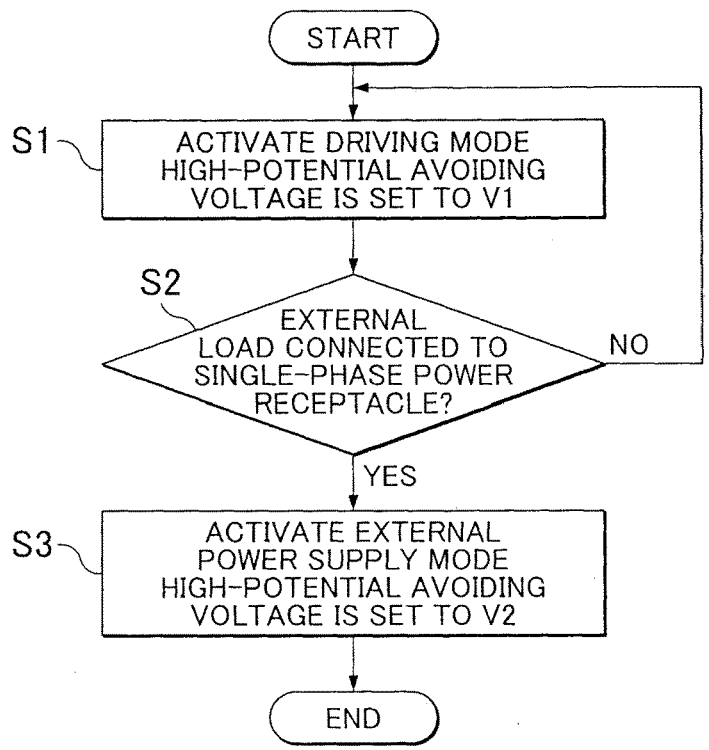
FIG. 2 is a flowchart showing an example of procedures in which a controller adjusts and controls the output of a fuel cell provided in a fuel cell system according to the embodiment of the invention.

A further description will be made of an example of control operation performed by the controller 50 in the vehicle 100. FIG. 2 is a flowchart showing an example of procedures performed by the controller 50 to regulate and control the output of the fuel cell provided in the fuel cell system 200 according to this embodiment.

In this embodiment, the controller 50 activates a driving mode to manage traveling of the vehicle 100, as a normal operation mode (step S1). In this driving mode, a first voltage V1 is set as a high-potential avoiding voltage of the fuel cell. As mentioned before, this first voltage V1 can be a voltage at which the possibility of occurrence of degradation of a cathode catalyst layer due to elution of a catalyst metal such as platinum or reduction of reactive area caused by sintering is relatively low (more specific numerical examples will be given later). This makes it possible to suppress excessive loss of platinum or other catalyst metal contained in the fuel cell during traveling of the vehicle 100.

The controller 50 then determines whether or not any external load (not shown) such as household electrical appliances, emergency illumination, or emergency power circuit equipment is connected to the single-phase power receptacle 70 (step S2). When no external load is connected to the single-phase power receptacle 70, the controller 50 returns to step S1 and controls operation of the fuel cell in the driving mode.

When an external load is connected to the single-phase power receptacle 70, the controller 50 activates, as an emergency operation mode, an external power supply mode to supply power to the external load (step S3). In this external power supply mode, a second voltage V2 is set as the high-potential avoiding voltage of the fuel cell. The second voltage V2 in the external power supply mode is set to a greater value than that of the first voltage V1 in the driving mode (V2>V1). More specifically, the second voltage V2 is preferably set to a voltage value that is greater than a range of oxidation and reduction potentials for a catalyst metal such as platinum contained in the fuel cell.

Table 1 below shows required stack outputs (total output of the fuel cell formed as a cell stack as described above) and examples of high-potential avoiding voltages V1 and V2 in respective modes (driving mode and external power supply mode), and characteristics of these modes.

TABLE 1

| | | | Characteristics | | |
|---|---|---|---|---|---|
| Mode type | Required stack output (kW) | Upper limit voltage for avoiding high potential (high-potential avoiding voltage) (V) | Operating time | Number of times for which unit cell voltage of fuel cell varies over oxidation and reduction potential of Pt | Effects on durability |
| Driving mode (normal) | 8.0 to 110 Ex. 1: 8.0 | NA 0.85 | Long | Large | Large |
| External power supply mode (emergency) | 0.0 to 5.0 Ex. 2: 5.0 Ex. 3: 0.5 Ex. 4: 0.0 | NA 0.90 0.95 OCV (1.0) | Short | Small | Small |

The required stack output in the driving mode is about 8.0 to 110 kW, for example. When the required stack output is 8.0 kW, for example, the first voltage V1 that is a high-potential avoiding voltage is set to about 0.85 V, for example (Example 1 in Table 1). The required stack output in the external power supply mode is about 0.0 to 5.0 kW, for example. When the required stack output is 5.0, 0.5, and 0.0 kW, for example, the second voltage V2 that is a high-potential avoiding voltage is set respectively to about 0.90, 0.95 V, and open circuit voltage (OCV) (1.0 V). The first voltage V1 and the second voltage V2 both indicate a unit cell voltage of the fuel cell. When the second voltage V2 is OCV (1.0 V), it can be considered that the mode is substantially not for avoiding high potential.

Figure 3:
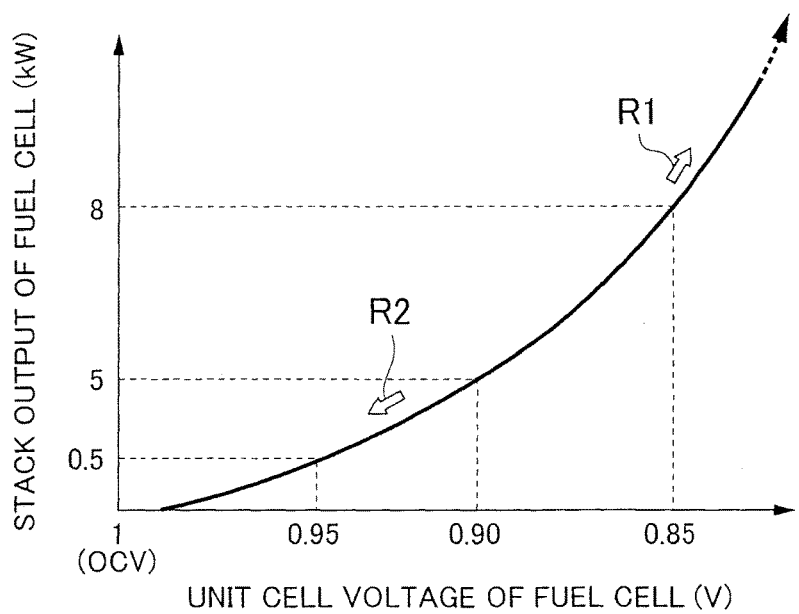
FIG. 3 is a graph showing an example of a relationship between unit cell voltage and stack output of a fuel cell mounted on a vehicle.

FIG. 3 is a graph showing an example of relationship between unit cell voltage and stack output of the fuel cell mounted on the vehicle 100 thus configured. In the curve shown in the graph, the region indicated by a white arrow R1 corresponds to the driving mode, and the region indicated by a white arrow R2 corresponds to the external power supply mode.

The means, method, and procedures for selectively setting the high-potential avoiding voltage (first voltage V1) for the driving mode and the high-potential avoiding voltage (second voltage V2) for the external power supply mode are not limited particularly. For example, the potential control of the unit cell voltage by the controller 50 may be realized by switching numerical parameters or the like of the high-potential avoiding voltage. In this case, a single or several values of each of the first voltage V1 and second voltage V2 are prestored in a memory incorporated in the controller 50. When the driving mode is activated in step S1 shown in FIG. 2, the value of the first voltage V1 is retrieved from the memory. When the external power supply mode is activated in step S3, the value of the second voltage V2 is retrieved from the memory. Operation of the fuel cell is controlled using these high-potential avoiding voltages.

Alternatively, the controller 50 may perform the potential control of the unit cell voltage, by storing a relational expression of the curve shown in FIG. 3 in the memory of the controller 50, instead of using fixed values as the first voltage V1 and the second voltage V2 as described above. The high-potential avoiding voltage in the external power supply mode may be set as appropriate based on a stack output of the fuel cell required according to a magnitude of the external load or a number of the external loads connected to the single-phase power receptacle 70 and the relational expression prestored in the memory.

Further, in place of the potential control by the controller 50, the control can be performed by adjusting various power generation parameters affecting the power generation capacity of the fuel cell so that values of the power generation parameters in the driving mode are different from values of the power generation parameters in the external power supply mode. Such power generation parameters include, for example, supply amount (flow rate) of the fuel gas and/or oxidation gas to the stack, humidity conditions in the stack, and temperature of the stack.

Figure 4:
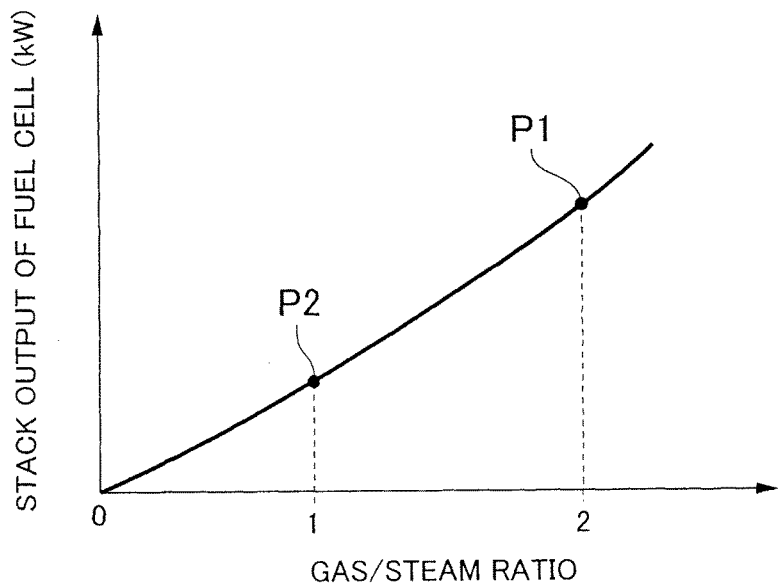
FIG. 4 is a graph schematically showing an example of variation in stack output relative to the ratio between amounts of oxidation gas (air) and water vapor supplied to the cell stack of the fuel cell.

FIG. 4 is a graph schematically showing an example of variation of the stack output relative to the ratio between amounts of oxidation gas (air) and water vapor which are supplied to the cell stack of the fuel cell (hereafter referred to as the "gas/steam ratio"). As seen from FIG. 4, the stack output tends to increase as the gas/steam ratio becomes greater. In FIG. 4, a stack output P1 that is required by the fuel cell in the driving mode can be obtained when the gas/steam ratio is equal to two. A stack output P2 that is required by the fuel cell in the external power supply mode can be obtained when the gas/steam ratio is equal to 1 (the gas/steam ratio=1).

As seen from this, while the value high-potential avoiding voltage itself as one of the power generation parameters for potential control by the controller 50 is kept the same between the driving mode and the external power supply mode, the gas/steam ratio is adjusted, for example, by varying the supply amount of oxidation gas by means of the controller 50. This makes it possible to realize such control that the high-potential avoiding voltages in the driving mode and the external power supply mode become substantially equivalent to the first voltage V1 and the second voltage V2, respectively.

Electric power supplied to the external load through the single-phase power receptacle 70 may be supplied from the fuel cell system 200 only, from both the fuel cell system 200 and the secondary battery 26, or from the secondary battery 26 only. When electric power is supplied to the external load with use of the secondary battery 26 or by way of the secondary battery 26, substantial high-potential avoidance control is not required in the fuel cell (for example, the second voltage V2 may be set to OCV (1.0 V) as described above).

According to the power supply system 20 provided in the vehicle 100 configured as described above, the high-potential avoiding voltage of the fuel cell in the external power supply mode is set to the second voltage V2 that is higher than the first voltage V1 in the driving mode. This makes it possible to output electric power lower than the generated power output of the vehicle 100 in its normal driving mode, when external power supply mode is implemented to supply electric power to the external load. Consequently, unlike the related art, the power supply system 20 is able to sufficiently suppress the generation of excessive electric power when electric power is supplied to the external load of about several kW or less by using the fuel cell of the fuel cell system 200 mounted on the vehicle 100 as the external power source.

The vehicle 100 is thus very useful as an external power source for supplying electric power directly to electric appliances or the like in general households, emergency shelters, restoration sites and the like in the case where power supply from commercial power systems (commercial power sources) is lost in a natural disaster or the like.

Further, since the fuel cell output can be reduced (electric power can be reduced) in the external power supply mode, the load to the fuel cell itself can be reduced and the generated current is reduced. This makes it possible to reduce the output loss due to so-called IR loss, and hence to improve the power generation efficiency of the fuel cell.

Figure 5:
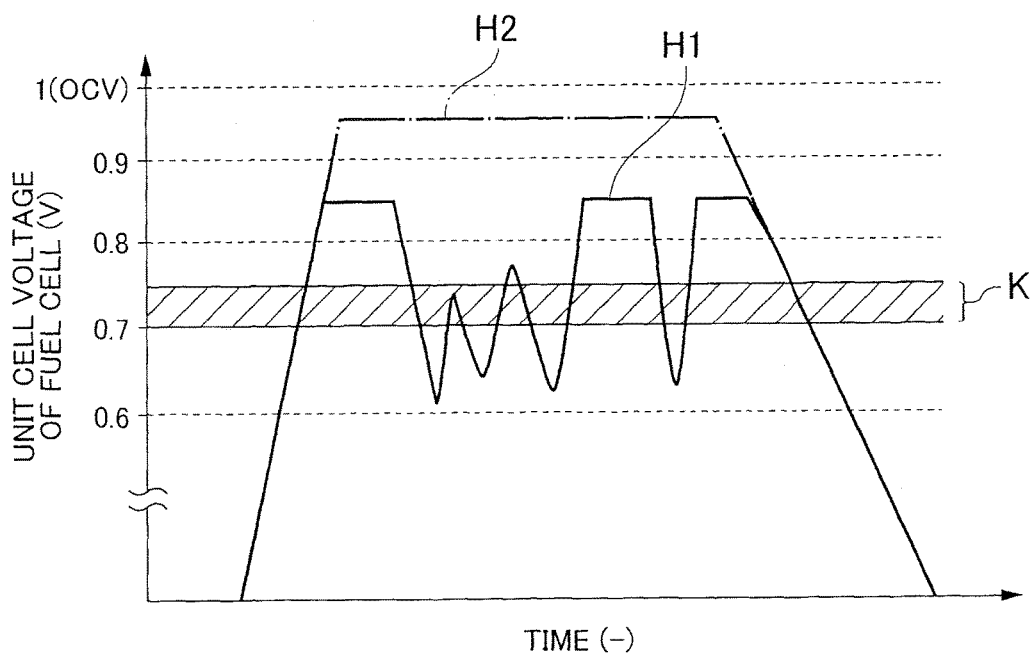
FIG. 5 is a graph schematically showing variations with time in unit cell voltage of a fuel cell in driving mode and in external power supply mode.

FIG. 5 is a graph schematically showing variation with time in unit cell voltage of the fuel cell in the driving mode and the external power supply mode. In FIG. 5, a solid line H1 represents unit cell voltage in the driving mode, and an alternate long and short dash line H2 represents unit cell voltage in the external power supply mode. In FIG. 5, a voltage range K indicated by oblique lines represents a region of the platinum oxidation and reduction potential used as a catalyst metal (roughly indicated to be 0.70 to 0.75 V). In this example, the high-potential avoiding voltage (first voltage V1) in the driving mode is set to a unit cell voltage=0.85 V (corresponding to a stack output of 8.0 kW), while the high-potential avoiding voltage (second voltage V2) in the external power supply mode is set to a unit cell voltage=0.95 V (corresponding to a stack output of 0.5 kW).

The driving mode is a normal operation mode of the vehicle 100, and the operating time is relatively long. In the driving mode, the accelerator 37 is depressed and released frequently by the user (the driver of the vehicle 100) according to road conditions and traffic conditions. Therefore, as indicated by the line H1 in FIG. 5, the number of times for which the unit cell voltage of the fuel cell varies up and down across the platinum oxidation and reduction potential (voltage range K) tends to be increased. In FIG. 5, when the unit cell voltage exceeds the voltage range K, platinum as a catalyst metal is oxidized and ionized to be eluted. When the unit cell voltage drops below the voltage range K, platinum ions are reduced and atomized whereby platinum is precipitated. As a result of the oxidation and reduction of the catalyst metal being repeated frequently, the durability of the fuel cell is affected greatly in the driving mode, as described in Table 1.

In contrast, the external power supply mode is an emergency operation mode of the vehicle 100, and hence the operating time in this mode is relatively short. In the external power supply mode, the accelerator 37 is usually not depressed or released by the user. Therefore, as indicated by the line H2 in FIG. 5, the number of times for which the unit cell voltage of the fuel cell varies up and down across the platinum oxidation and reduction potential (voltage range K) tends to relatively reduce. As a result, in the external power supply mode, oxidation or reduction of the catalyst metal does not occur frequently, and as described in Table 1, the durability of the fuel cell is not significantly affected by the external power supply mode. This makes it possible to prevent the inconvenience of degradation promotion in performance of the fuel cell, even if the second voltage V2 as the high-potential avoiding voltage in the external power supply mode is higher than the first voltage V1 in the driving mode.

In other words, although when the high-potential avoiding voltage in the external power supply mode is high, elution of the catalyst metal tends to increase in comparison with when it is low, the oxidation and reduction of the catalyst metal does not occur frequently as described above in the external power supply mode. Therefore, overall, the effect on the degradation in performance of the fuel cell is allowable in terms of actual operation. Since oxidation and reduction of the catalyst metal occur more frequently in the driving mode than in the external power supply mode, the high-potential avoiding voltage must be set to a lower value in the driving mode than in the external power supply mode in order to suppress the performance degradation of the fuel cell. This means that the fuel cell is controlled in the driving mode such that the unit cell voltage of the fuel cell does not exceed the first voltage V1.

It should be understood that, as mentioned in the above, the invention is not limited to the foregoing embodiment, but may be varied and modified in various manners without departing from the scope of the invention.

The above power supply system provides excellent advantageous effects as described above. Therefore, it is widely and effectively applicable to fuel cells in general, vehicles, equipment, systems, and facilities having a fuel cell, and manufacture thereof. Furthermore, the power supply system is extremely useful as an external power source for supplying electric power directly to general households, emergency shelters, restoration sites and the like when the power supply from the commercial power source is lost due to a disaster or the like.

The invention claimed is:

1. A power supply system comprising:
   a fuel cell mounted on a vehicle; and
   a controller including a processor for executing a computer program stored in memory, the controller programmed to:
   operate the fuel cell in a driving mode to supply electric power to the vehicle when the vehicle travels; and
   operate the fuel cell in an external power supply mode when electric power is supplied from the fuel cell to an external load,
   wherein:
   in the driving mode, the controller is programmed to set a high-potential avoiding voltage that is an upper limit voltage for avoiding a high potential during power generation by the fuel cell to a first voltage; and
   in the external power supply mode, the controller is programmed to set the high-potential avoiding voltage during the power generation by the fuel cell to a second voltage higher than the first voltage, wherein the external load is located outside of the vehicle.

2. The power supply system according to claim 1, wherein: the fuel cell includes a catalyst metal; and the second voltage is set to a voltage higher than a range of oxidation and reduction potentials for the catalyst metal.

3. The power supply system according to claim 1, wherein the controller is further programmed to control a power generation parameter of the fuel cell such that a unit cell voltage of the fuel cell does not exceed the high-potential avoiding voltage.

4. A power supply system comprising:
   a fuel cell mounted on a vehicle to supply electric power to the vehicle when the vehicle travels; and
   a controller including a processor for executing a computer program stored in memory, the controller programmed to:
   control a power generation parameter of the fuel cell so that a unit cell voltage of the fuel cell does not exceed a high-potential avoiding voltage that is an upper limit voltage for avoiding a high potential when electric power is supplied from the fuel cell to an external load, and
   control the power generation parameter so that the unit cell voltage when the vehicle travels is lower than the unit cell voltage when the electric power is supplied from the fuel cell to the external load
   wherein the external load is located outside of the vehicle.

* * * * *